United States Patent
Belvroy et al.

(10) Patent No.: US 6,753,088 B1
(45) Date of Patent: Jun. 22, 2004

(54) LOCALLY PROVIDING A COATED ARTICLE WITH A SEALING MATERIAL

(75) Inventors: Renauld Robert Belvroy, Heemskerk (NL); Jan Willem Van Veenen, Beverwijk (NL)

(73) Assignee: Corus Technology BV, Ijmuiden (NL)

( * ) Notice: Subject to any disclaimer, the term of this patent is extended or adjusted under 35 U.S.C. 154(b) by 0 days.

(21) Appl. No.: 09/673,722

(22) PCT Filed: May 6, 1999

(86) PCT No.: PCT/EP99/03239

§ 371 (c)(1),
(2), (4) Date: May 24, 2001

(87) PCT Pub. No.: WO99/57180

PCT Pub. Date: Nov. 11, 1999

(30) Foreign Application Priority Data

May 6, 1998 (NL) .............................................. 1009088

(51) Int. Cl.[7] .......................... B32B 15/08; B32B 27/08; B32B 27/36; B32B 27/40; B32B 31/12

(52) U.S. Cl. .................... 428/423.7; 428/195; 428/458; 428/480; 428/35.8; 428/35.9; 428/35.7; 427/223; 427/224; 427/314; 427/322; 427/331; 427/372.2; 427/412.1; 427/412.5; 215/235; 215/252; 215/329; 215/341; 215/347; 215/352; 215/349

(58) Field of Search ............................. 428/423.7, 458, 428/480, 195; 427/532, 223, 225, 224, 331, 372.2, 373, 374.1, 384, 385.5, 388.1, 388.2, 393.5, 407.1, 412.1, 314.322; 215/235, 250, 252, 316, 341, 347, 348, 349, 350, 351, 352, DIG. 2

(56) References Cited

U.S. PATENT DOCUMENTS

| | | | | | |
|---|---|---|---|---|---|
| 3,145,242 | A | * | 8/1964 | Bryan | .......................... 264/80 |
| 3,607,818 | A | * | 9/1971 | Trubisky et al. | ............. 524/377 |
| 4,143,790 | A | * | 3/1979 | Ueno et al. | ............... 220/62.13 |
| 4,307,127 | A | * | 12/1981 | Shah | ........................... 427/461 |
| 4,362,775 | A | * | 12/1982 | Yabe et al. | .................. 428/213 |

(List continued on next page.)

FOREIGN PATENT DOCUMENTS

| | | |
|---|---|---|
| GB | 2092999 | 8/1982 |
| JP | 54-138072 A | * 10/1979 |

OTHER PUBLICATIONS

"Gas Flame Technology", Cliff Bartley and P.B. Sherman, published by the English company Sherman Treaters (published prior to the filing date of the present application).

*Primary Examiner*—Vivian Chen
(74) *Attorney, Agent, or Firm*—Stevens, Davis, Miller & Mosher, LLP

(57) ABSTRACT

A method for at least locally providing an article coated with an organic coating with a layer of readily deformable sealing material (so-called compound), which involves a layer of an intermediate of the compound being applied to the coating layer, after which the article is temporarily kept at an elevated temperature in order to form the compound from its intermediate, wherein the coating layer of the article comprises a polyethylene terephthalate and the compound is chosen from the group consisting of urethanes, amides, mixtures thereof and heteropolymers thereof, and in that the free surface of the coating layer prior to the application of the intermediate of the compound, at least at the location where this intermediate is applied, is briefly subjected to a processing operation from the group of equivalent processing operations comprising a flame treatment in the course of which the coating layer does not melt.

20 Claims, 1 Drawing Sheet

U.S. PATENT DOCUMENTS

| | | | | |
|---|---|---|---|---|
| 4,392,580 A | * | 7/1983 | Ochs | 215/332 |
| 4,432,820 A | | 2/1984 | Thompson | |
| 4,756,438 A | * | 7/1988 | Ryder | 215/252 |
| 4,818,577 A | | 4/1989 | Ou-Yang | |
| 4,844,272 A | * | 7/1989 | Dutt | 215/232 |
| 5,103,991 A | * | 4/1992 | Collins | 215/329 |
| 5,169,033 A | * | 12/1992 | Shay | 222/153.09 |
| 5,190,177 A | * | 3/1993 | Collins | 215/252 |
| 5,225,125 A | * | 7/1993 | Wildfeuer et al. | 264/46.6 |
| 5,769,255 A | * | 6/1998 | Ohmi et al. | 215/345 |
| 5,826,739 A | * | 10/1998 | Valyi | 215/253 |
| 5,980,806 A | * | 11/1999 | Ohmi et al. | 264/268 |

* cited by examiner

LOCALLY PROVIDING A COATED ARTICLE WITH A SEALING MATERIAL

FILED OF THE INVENTION

The invention relates to a method for at least locally providing an article coated with an organic coating with a layer of readily deformable sealing material (a so-called compound), which involves a layer of an intermediate of said compound being applied to the coating layer, after which the article is temporarily kept at an elevated temperature in order to form the compound from its intermediate

BACKGROUND OF THE INVENTION

At many points in industrial applications it is necessary to be able to connect such an article and another article to one another in, for example, a vacuum-tight manner. A known example of this are the generally known screw tops on glass jars which are designed to contain food. In order to extend the shelf life of these foods it is then essential for the lid to be able to be seal the jar in a gas-and-vacuum-tight manner, said sealing also being able to withstand a pasteurization or sterilization treatment of the contents of the jar.

Since the mating rims of lid and jar are not always fashioned so as to provide a completely smooth seal, the absolute seal is achieved with the aid of an interposed layer of the readily deformable sealing material, the compound. Processable intermediates of such compounds are commercially available in various types and chemical compositions, many of these compounds having a composition based on PVC. After application of the processable intermediate to the article in question the intermediate is cured to produce the compound itself. Particularly for use with screw tops it is required for the applied layer of compound to have good adhesion to the article to which it is applied. If said adhesion is inadequate, the layer of compound, particularly when used in screw tops, will curl up or shear off, and a good seal is no longer guaranteed.

As a rule, articles provided with a compound layer are first coated with an organic coating. This can be the case, for example, with screw tops made of steel. Whilst a steel lid can be protected against corrosion by applying a metallic top layer, preference is nevertheless given in many cases to the additional application of a coating. This may be desirable, for example, to protect the taste of the contents of a jar or to allow the inside of the lid to be provided with pictures or text. Good adhesion of a compound to a coating layer in many cases is found to constitute a problem that cannot readily be solved. In particular this is the case if the article is coated with organic coating based on a PET (polyethylene terephthalate).

SUMMARY OF THE INVENTION

The invention provides a solution for this generally experienced problem. The invention then, with the method assumed to be known, consists in the coating layer of the article comprising a polyethylene terephthalate and the compound being chosen from the group consisting of urethanes, amides, mixtures thereof and heteropolymers thereof, and in the free surface of the coating layer prior to the application of the intermediate of the compound, at least at the location where this intermediate is applied, being briefly subjected to a processing operation from the group of equivalent processing operations comprising a flame treatment in the course of which the coating layer does not melt.

It should be noted that the layer of compound in many cases has been formed by a special treatment of an intermediate of the compound as applied to the article. For example, said intermediate will have to be cured after having been applied, for example by a solvent or a dispersant being driven off therefrom with the aid of a thermal treatment.

It was found, surprisingly, that the additional subjection of the coating layer to the proposed processing operation has the effect, with PET polymers, that the surface of the coating layer has acquired a very greatly improved potential for adhesion to the compound. Surprisingly, said improvement is found to occur, in particular, with compounds of the abovementioned type. The adhesion of PVC-based compounds is as a rule not improved, in many cases even deteriorates, after the treatment described.

It is also noteworthy that an effect is involved here which comes about due to the type of processing operation in the form of a flame treatment, and that, for example, an increase in temperature on its own will not, as a rule, achieve a comparable effect. In some other thermal processes in individual cases somewhat similar other conditions are apparently effected, as a result of which, for example in the case of heating with the aid of a plasma, a positive effect is also observed with some PET coatings. Very good results on virtually all customary PET coatings are however obtained according to the invention if the operation of subjecting the free surface of the coating layer to a processing operation is effected with the aid of a flame which is obtained by burning a stoichiometric mixture of propane and combustion air.

It should be noted that flame treatments and the conditions under which these are carried out are generally known for the purpose of acting on free surfaces. Reference can be made, for example, to the publication "Gas Flame Technology" by Cliff Bartley and P. B. Sherman, published by the English company Sherman Treaters. There the effect of the flame treatment on a free surface is ascribed to the action on the surface of free radicals, ions, neutral compounds and electrons formed in the flame. It will be evident that it is possible, by varying process parameters, to obtain a group of physicochemical processing operations which are equivalent in terms of the end result. Flame treatments are known for increasing the surface tension. This proves not to be a determining factor for the adhesion of compounds, however.

In the case of exposure to an open flame it is possible to proceed in various ways. However, it was found to be preferable for the article and a flame, obtained by combustion of propane, to be moved with respect to one another while in contact with one another. It should be noted in this context that in many cases an end product such as a lid is fabricated from strip material which after a pretreatment is converted into a final form by punching and further mechanical treatment. In the case of coated steel screw tops, for example, it is possible for a steel strip first to be coated and to undergo the flame treatment described, after which blanks are punched from said strip which are then made into screw tops which finally are provided with an annular layer of compound in their base.

As stated previously, the compound layer will be formed firstly by an intermediate of the compound being applied, said intermediate then being cured to produce the compound proper. According to the invention, said curing to produce the compound can be effected by the article, after application of the intermediate, being kept for at least 40 sec at a temperature of between 200 and 230° C. and then being cooled. Obviously, in the case of a strip-like article a highly feasible option is to carry out thermal treatment by passing the strip through a continuous furnace.

Although the novel method is applicable to coated articles whose substrate may comprise widely diverse materials, such as plastics, the invention proves to be particularly advantageous when applied to articles comprising a metal substrate. In particular, a suitable application was found if the metal substrate consists of a metallically coated steel plate. Possible applications are tin plate or steel plate with an ECC coating (electrolytic chromium/chromium oxide coating).

The above referred to a coating layer on the article, but with many applications it will be preferable for said coating layer itself to consist of a plurality of layers. For example, an under layer may be chosen which ensures good adhesion to, for example, a metal substrate, whilst a top layer may be chosen because of its inert characteristics with respect to materials with which the article must come into contact. For example, if the article is a lid of a tin for food or drinks, the top layer must be inert with respect to the food and/or drinks in question and likewise not impart thereto any colour, odour or taste.

Apart from the method described the invention further relates to the coated article thus obtained, which is locally provided with a layer of compound. In particular the invention then relates to an article thus coated which is in the form of a lid for a vessel or a jar. Said vessel can be a drinks can, but also, for example, a paint tin or an oil drum. Because of the strong adhesion, obtained thanks to the invention, of the compound to the coating layer, the coated object obtained is suitable, in particular, as a lid that can be twisted off. The effect of the good adhesion of the compound is that when the lid is tightened and loosened again the compound will be prevented from being torn from the coating layer, from curling up, and from thus failing to be able to retain its function as a seal.

Apart from the fabrication of a coated article as an end product, the invention also relates to a method for preparing a semifinished product coated with an organic coating and having improved adhesion thereto, of a layer of a compound to be applied from the group comprising urethanes, amides, mixtures thereof and heteropolymers thereof. Such prepared semifinished products are usually commercial products which are supplied by the materials manufacturer to the industry where the finished articles are produced.

The method is then characterized in that the coating layer comprises a polyethylene terephthalate, and in that the free surface of the coating layer, at least at the location where the layer of compound is to be applied, is briefly subjected to a processing operation from the group of equivalent processing operations comprising a flame treatment in the course of which the coating layer does not melt. It will be evident that this method for preparing a varnished semifinished product can further be carried out in the same manner as described hereinabove.

The method is then characterized in that the coating layer comprises a polyethylene terephthalate, and in that the free surface of the coating layer, at least at the location where the layer of compound is to be applied, is briefly subjected to a processing operation from the group of equivalent processing operations comprising a flame treatment in the course of which the coating layer does not melt. It will be evident that this method for preparing a varnished semifinished product can further be carried out in the same manner as described herein above. For example, the subjecting of the free surface of the coating layer to the processing operation may be effected with the aid of a flame which is obtained by burning a stoichiometric propane/combustion air mixture. Typically, the flame is an open flame obtained by combustion of propane and the exposure to the open flame is effected by the article and the flame being moved with respect to one another while in contact with one another. Typically the article comprises a metal substrate, for example, a metallically coated steel plate. Typically, the coating layer consists of a plurality of layers.

Finally, the invention also relates to the coated semifinished product fabricated in accordance with the above-specified method. In this context it was found to be important for said semifinished product to have been converted into a form suitable for further processing to a coated article as an end product, as explained in the above-described method.

DETAILED DESCRIPTION OF THE PREFERRED EMBODIMENTS

Figure 1:
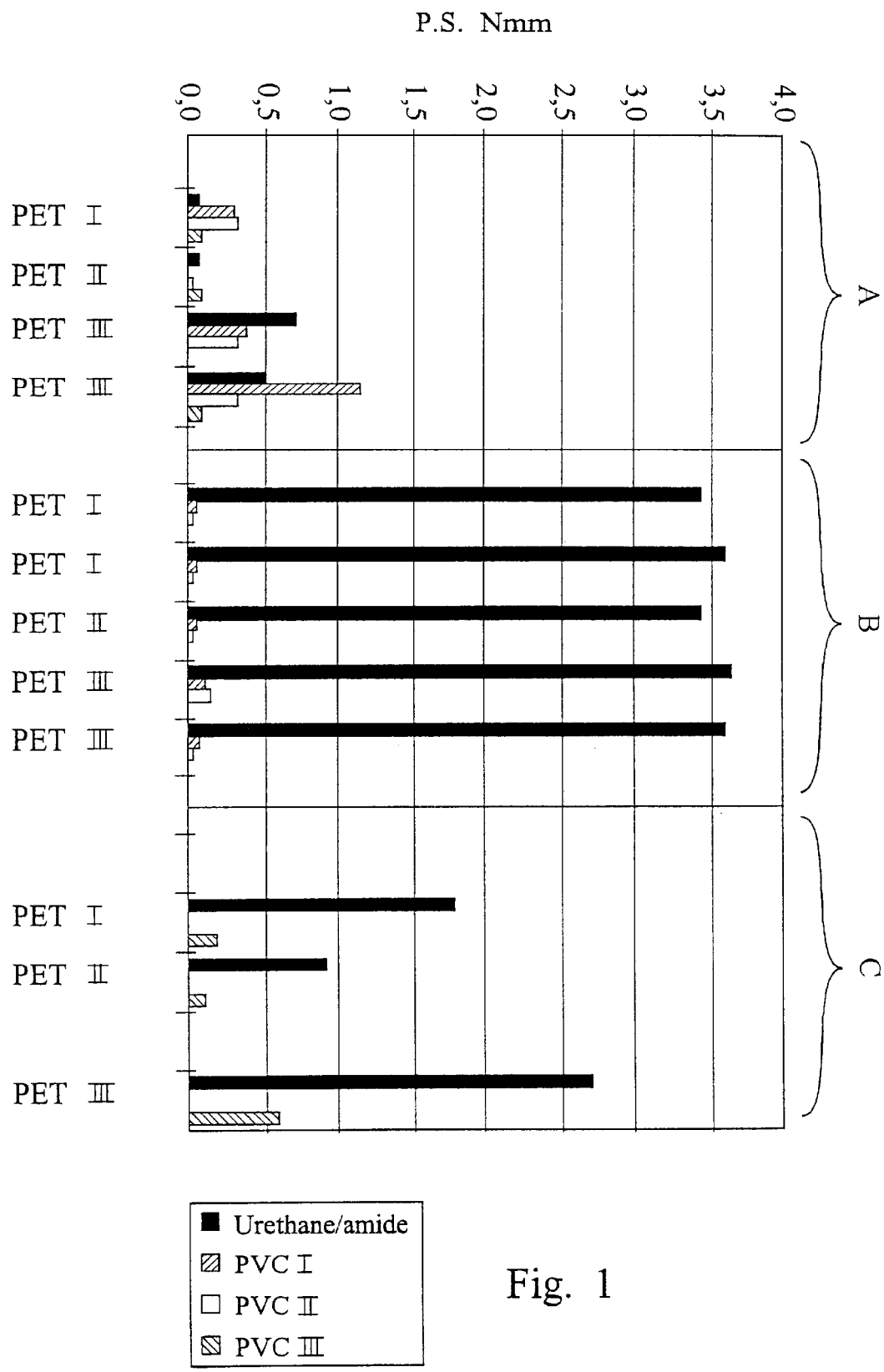
FIG. 1 shows data illustrating test results.

The invention will be explained below with reference to a few test results with reference to a figure in which these test results are illustrated.

Tests were carried out, inter alia, using thin steel plate which had first been provided, in a customary manner, with a metallic ECC coating. Applied to said steel plate was a coating system whose top layer consists of PET (polyethylene terephthalate). Three PET coatings were used, designated by the codes PET I; PET II and PET III. PET here generally refers to the polymerization product of a 50–50 mol % mixture of an acid comprising more than 70% of terephthalic acid and an alcohol comprising more than 60% of ethylene glycol. Copolymers of PET can be obtained both by employing, as the acid, a mixture of terephthalic acid with another acid and by using, as the alcohol, a mixture of ethylene glycol with another alcohol. In particular, PET I is to be understood as a virtually pure PET. PET III refers to a copolymer of PET, in which the alcohol also contains diethylene glycol. PET II is a copolymer in which the alcohol also comprises cyclohexanedimenthanol. The PET materials used have an intrinsic viscosity I.V. of between 0.5 and 1.5. Applied to the specimens were strips of various compounds, said strips having a thickness of 1 mm, a width of 12 mm and a length of about 15 cm. Various commercially available compounds were applied, namely three PVC types from various suppliers, and one urethane/amide type. The three PCV types are designated hereinafter as PVC I, PVC II and PVC III.

After the intermediate of the compounds had been applied, the samples were subjected to a heat treatment required for the treatment of these compounds. In the process, the compound is desiccated and will adhere to the coating layer.

This heat treatment was carried out at a temperature of 220° C. for a period of 120 sec.

The adhesion of the compound strip to the coated substrate was determined with a "180° peel test" as generally used.

This involves the compound strip of width 12 mm being pulled off the coated substrate over an angle of 180° at a rate of 1.0 cm/minute. The force this gives rise to, expressed in N/mm, is the "peel strength" P.S., which is a measure of the adhesion between compound and coating layer.

Three series of tests were carried out. Firstly, test series A (see the figure) in which the strip of compound was applied to the coating layer which had not been pretreated.

Then test series B, in which various types of compound were applied to various PET coating layers after these had undergone a flame treatment. The flame treatment took place with the aid of a propane flame, the coated steel samples in the form of strip being moved at a speed of 15 m/minute through a flame having a height of 85 mm.

In test series C the compounds were applied after the coating layers had been subjected to a treatment with a gas plasma. The plasma had been set to a power of 300 Watts for 60 sec. To form the plasma, 60 ml/min of oxygen were used with an inlet pressure of 25 Pa The following conclusions can be drawn from the accompanying figure:

In the case of the untreated coating layers a large scatter in terms of peel strength was observed between the various combinations of PET coatings and compounds. Not in a single case was a peel strength P.S. of >1.2 N/mm found, a result that can be regarded as inadequate.

If a plasma treatment was employed, the peel strength when using PVC-type compounds was inadequate each time. A large scatter was likewise found between the various combinations of a urethane/amide compound with various PET coatings, with a single peak where the peel strength can be regarded as good (2.7 N/mm).

After a flame treatment of the PET coatings, the adhesion of all PVC compounds to the coating layer proved highly inadequate, and even less than in the case of the untreated coating layer.

After a flame treatment of the PET coatings, the adhesion of the urethane/amide type compounds to all the PET-type coatings was found to be very good in all cases. The scatter between the measured strength data was low, around a level of 3.5 N/mm. This permits the conclusion that this measured value in fact corresponds to the tensile strength of the compound and that the adhesion between compound and the PET coating is stronger than the tensile strength of the compound.

After long-term tests, in which the flame-treated material was stored for up to 2 months prior to the formation of a compound layer it was found that the peel strength had not decreased.

The full compound layers on the coating layer were then subjected to a sterilization test. To this end, the samples were kept at a temperature of 121° C. in demineralized water for 90 minutes. This treatment was found not to effect the quality of the compound layer and its adhesion to the coating layer.

What is claimed is:

1. A method for at least locally providing an article coated with an organic coating with a layer of readily deformable sealing material compound, comprising:
   applying a layer of an intermediate of the compound to the coating layer on the article,
   after said applying step temporarily subjecting the compound to a heat treatment sufficient to form the compound from the intermediate,
   wherein the coating layer of the article comprises a polyethylene terephthalate and the compound is chosen from the group of known compounds consisting of urethanes, amides, mixtures thereof and heteropolymers thereof, and
   subjecting a free surface of the coating layer prior to the application of the intermediate of the compound, at least at the location where this intermediate is applied, to a processing operation comprising a flame treatment in the course of which the coating layer does not melt.

2. Method according to claim 1, wherein said subjecting of the free surface of the coating layer to the processing operation is effected with the aid of a flame which is obtained by burning a stoichiometric propane/combustion air mixture.

3. Method according to claim 2, wherein the flame is an open flame obtained by combustion of propane and the exposure to the open flame is effected by the article and the flame being moved with respect to one another while in contact with one another.

4. Method according to claim 1, wherein the article, after the application of the intermediate of the compound, is kept for at least 40 sec at a temperature of between 200 and 230° C. and is then cooled.

5. Method according to claim 1, wherein the article comprises a metal substrate.

6. Method according to claim 1, wherein the metal substrate consists of a metallically coated steel plate.

7. Method according to claim 1, wherein the coating layer consists of a plurality of layers.

8. Article coated with an organic coating, locally provided with a layer of compound, fabricated in accordance with the method according to claim 1, wherein the article is in the form of a lid for a vessel or a jar.

9. Coated article according to claim 8, wherein the article is in the form of a lid that can be twisted off.

10. Semifinished product coated with an organic coating layer and fabricated by a method for improving the adhesion to the semifinished product of a layer to be applied thereto of a compound selected from the group of known compounds consisting of urethanes, amides, mixtures thereof and heteropolymers thereof, comprising:
    subjecting a free surface of the coating layer prior to the application of an intermediate of the compound, at least at the location where the layer of compound is to be applied, to a processing operation comprising a flame treatment in the course of which the coating layer does not melt,
    wherein the product has been converted into a form suitable for further processing to give a coated article made according to the method of claim 1.

11. Semifinished product according to claim 10, wherein said flame treatment is effected with the aid of a flame obtained by burning a stoichiometric propane/combustion air mixture.

12. Semifinished product according to claim 11, wherein the flame is an open flame obtained by combustion of propane and the exposure to the open flame is effected by the article and the flame being moved with respect to one another while in contact with one another.

13. Semifinished product according to claim 10, wherein the article, after the application of the intermediate of the compound, is kept for at least 40 sec at a temperature of between 200 and 230° C. and is then cooled.

14. Semifinished product according to claim 10, wherein the article comprises a metal substrate.

15. Method for preparing a semifinished product coated with an organic coating layer comprising a polyethylene terephthalate, for improving the adhesion to the semifinished product of a layer to be applied thereto of a compound selected from the group of known compounds consisting of urethanes, amides, mixtures thereof and heteropolymers thereof, comprising:
    subjecting a free surface of the coating layer prior to the application of an intermediate of the compound, at least at the location where the layer of compound is to be applied, to a processing operation comprising a flame treatment in the course of which the coating layer does not melt.

16. Method according to claim 15, wherein said flame treatment is effected with the aid of a flame which is obtained by burning a stoichiometric propane/combustion air mixture.

17. Method according to claim 15, wherein the flame is an open flame obtained by combustion of propane and the exposure to the open flame is effected by the article and the flame being moved with respect to one another while in contact with one another.

18. Method according to claim 15, wherein the article comprises a metal substrate.

19. Method according to claim 18, wherein the metal substrate consists of a metallically coated steel plate.

20. Method according to claim 15, wherein the coating layer consists of a plurality of layers.

* * * * *